Feb. 16, 1954
B. E. DEL MAR
2,669,402
HIGH STRENGTH CABLE NETWORK FOR IMPACT BULKHEADS
Filed Aug. 11, 1951
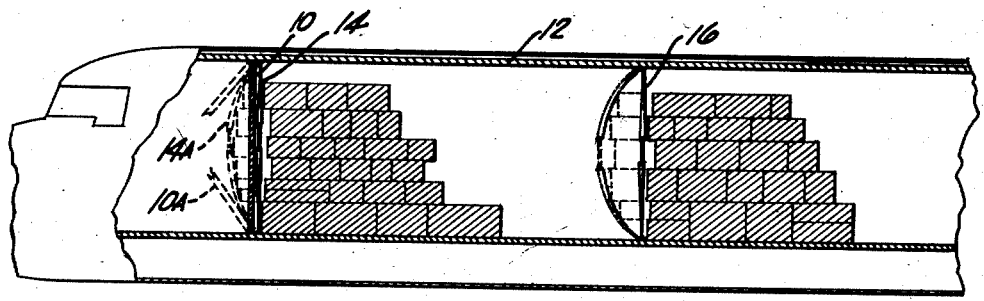
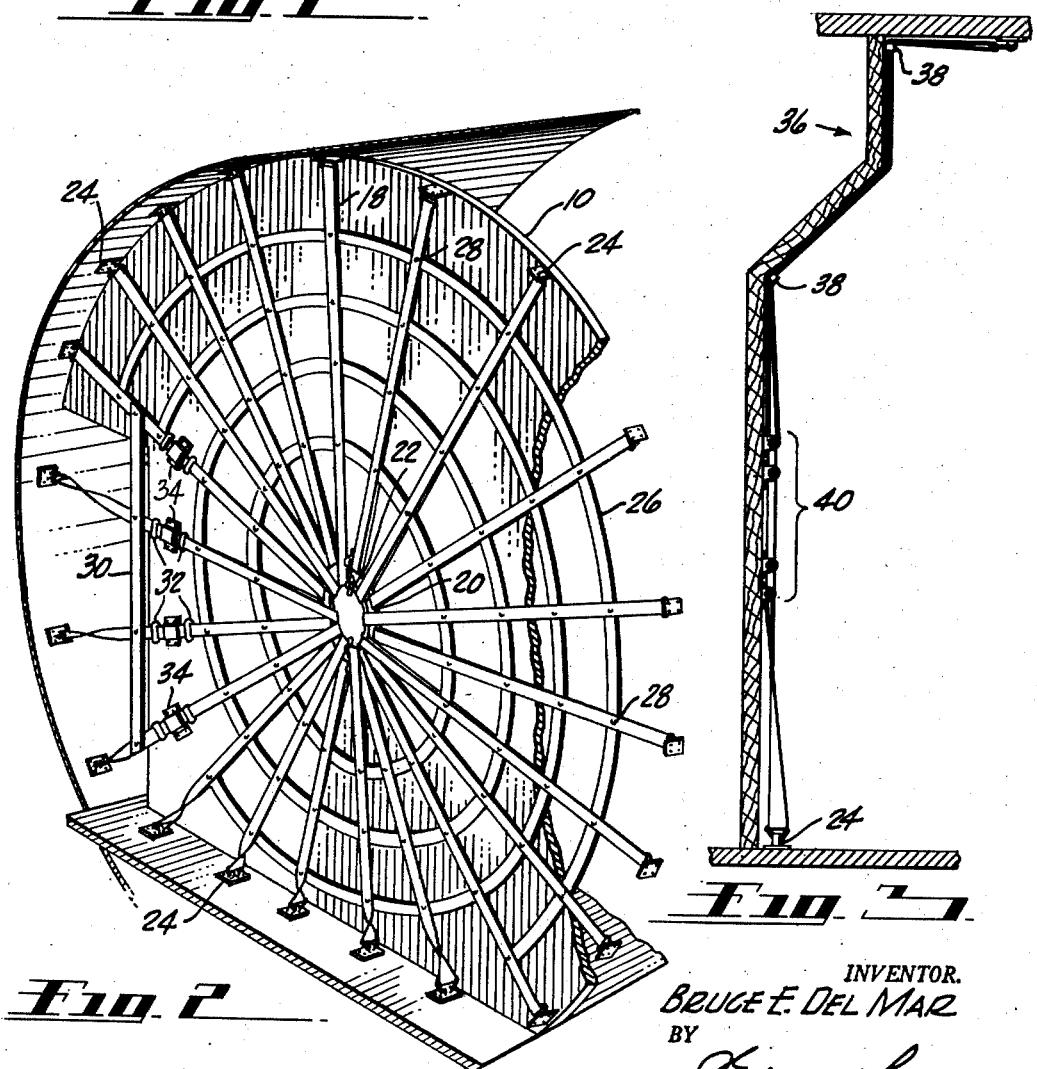
INVENTOR.
BRUCE E. DEL MAR
BY
Edwin Coates
- ATTORNEY -

Patented Feb. 16, 1954

2,669,402

UNITED STATES PATENT OFFICE 2,669,402

HIGH STRENGTH CABLE NETWORK FOR IMPACT BULKHEADS

Bruce E. Del Mar, Los Angeles, Calif., assignor to Douglas Aircraft Company, Inc., Santa Monica, Calif.

Application August 11, 1951, Serial No. 241,475

9 Claims. (Cl. 244—121)

This invention relates to high strength cable networks and more particularly to the application of such networks in reinforcing and otherwise aiding an impact bulkhead in resisting abnormal loads sometimes imposed by the movement of cargo carried in aircraft and other vehicles.

Various expedients have been proposed for preventing normal cargo movement and the violent movements often caused by rapid deceleration of the vehicle carrying the cargo. In the case of cargo carrying aircraft such expedients as cargo tie down rings, straps, ropes and other well known means have been used. However, in event of failure of such tie down means there is no other restraint against forward movement of the cargo other than the conventional bulkhead which separates the pilot from the cargo area. This is even more true when the nature of the cargo is such that conventional tie down means cannot be used, such as in the case of a load of small packages of varied sizes. Bulkheads now commonly in use are adequate to resist normal flight shifting of the cargo but, by reason of their relative weakness in the direction of the longitudinal axis of the fuselage, are inadequate to resist impact loads brought about by crashes, emergency landings, or other situations causing rapid deceleration. To design conventional bulkheads which would protect the pilot by resisting such abnormal deceleration would require the use of heavy reinforcement materials and expensive fastening expedients in order to properly position the bulkhead at any chosen station along the length of the fuselage resulting in excessive weight for the strength desired. The fault is not with the fuselage construction but rather it is the fact that the bulkhead must be disposed in a relatively thin plane perpendicular to the centerline of the fuselage. This of course is necessary to conserve valuable space in the fuselage.

When the bulkhead receives abnormal impacts such as might be imposed by a belly landing, the cargo's forward inertia invariably causes the bulkhead to fail in shear. The disposition of the bulkhead in a plane bisecting the fuselage simply means that the tension bearing qualities of the bulkhead cannot be utilized to their fullest extent. The cargo load simply reaches the ultimate shear strength of the bulkhead prior to the time any substantial tension load is imposed, hence the tension bearing qualities of the bulkhead serve only a relatively little useful purpose. This simply means that too great an increase in bulkhead weight and size is required in order to increase its shear strength to the extent that it could resist impact loading in emergencies.

The present invention solves these problems by providing a flexible network of elongate yieldable bands which are disposed as a surface in close proximity to the bulkhead structure. The network is formed of elongate yieldable bands preferably disposed radially from some generally central point in the surface it forms. Concentric reinforcing bands may also be added to the network in the preferred form in order to prevent separation of the radial bands by small cargo packages or items.

When installed in the most efficient manner the net will be subjected to some fairly substantial tension loading just prior to the time that the bulkhead fails. Therefore, the net will immediately resist further cargo movement at all times after failure of the bulkhead. The combining of bulkhead and net design to effectively operate as a coooperating unit leads to maximum resistance to impact and minimum installation weight. The net of course remedies the bulkhead's weakness in shear since the highly flexible network can only be loaded primarily in tension regardless of the direction of the cargo movement in relation to the surface formed by the network.

Other features and advantages of the present invention will be apparent from the following description taken in connection with the accompanying drawing in which:

Figure 1 is fragmentary side elevation partly in section illustrating one possible cargo arrangement within an aircraft utilizing the present invention and showing in dotted lines the operation of the cargo networks after impact loading;

Figure 2 is a perspective view depicting the cargo network as installed in the fuselage of a cargo aircraft; and Figure 3 is a side elevation illustrating another type of cargo network installation.

Referring now to Figure 1, an impact bulkhead or partition 10 is disposed in a plane perpendicular to the centerline of the fuselage 12 in order to compartmentalize the aircraft and separate the pilot from the cargo area. The network 14 is shown disposed in a plane in close proximity and parallel to the bulkhead. A second network 16 serves to further compartmentalize the fuselage and to slow the movement of cargo in a forward direction and thereby reduce the loading on the bulkhead and first network 14 when a rapid deceleration occurs. In many cases it is probable that the second network will eventually give way under the impact of the cargo. However, the cargo will be slowed sufficiently so that the combined resistance of the bulkhead and its cooperating network 14 will be able to stop the cargo short of the pilot, co-pilot, and the valuable equipment normally present in the pilot's compartment. The use of a second network in place of a second bulkhead also facilitates cargo loading as the network may be displaced slightly in order to accommodate the cargo. Alternatively, it may be installed after the cargo has been loaded.

The results of a rapid deceleration are shown in dotted lines in Figure 1. The broken bulkhead 10A is shown in dotted lines as is the impact loaded network 14A to illustrate how the network continues to yield and resist the cargo movement after failure of the bulkhead. Static tests on the network of the present invention indicate that the networks now in actual use provide a great deal more impact resistance than that of the standard bulkhead. The weight of the net and the space it occupies in relation to the weight and volume of the bulkhead is negligible.

Figure 2 illustrates the presently preferred form of the network. A plurality of elongate yieldable bands 18 extend radially outward from retention means such as the concentric mounting rings 20 and 22. Two mounting rings are here employed simply to provide a greater circumferential distance in which to mount the bands. The periphery of the network, formed by the outer ends of the bands, is joined to the fuselage by a plurality of attachment means 24 which may be rivets, blind fasteners, snap rings, bolts or the like. The bands may be made of metallic cable, metallic strap, nylon, rope and other fibers or any material which will yield substantially when subjected to large tension loads. The material need not be elastic, that is, capable of returning quickly to its original no load position. The only requirement is that it be capable of withstanding large tensile loads while undergoing deformation. Elastic materials which meet these requirements are of course preferable since they may be repeatedly loaded and need not necessarily be discarded after once resisting a heavy impact load.

The form shown in Figure 2 also utilizes a plurality of concentrically arranged bands 26 which are secured to the radial bands by rivets 28 or other suitable fastening devices such as staples, stitches, eyelets and so on. A few of the radial bands 18 are connected by a cross-piece 30 in order that they will not become tangled when their attachment means 24 are released to permit passage of crew members to and from the cargo area of the fuselage. The bands so connected pass slidably through an oversize hole in guide members 34 which are mounted on or integral with the bulkhead 10. The bands are thus permitted to move longitudinally relative to the guide member. However, this movement is restricted to about an inch either way by the presence of small collars 32 which are swaged onto or otherwise firmly secured to the respective bands at points located on opposite sides of each guide member. Such an arrangement prevents the transmission to the remainder of the network of local tension loads that may occasionally be imposed on the bands in the area of the passageway. This is desirable in order that the network will not be shifted from its predetermined optimum functional location relative to the bulkhead. This problem arises by reason of the fact that normal loads imposed by cargo movement are not taken by the bulkhead in the area of the passageway when the arrangement is such that the passageway is formed by an opening in the bulkhead, thereby leaving the bands in an unsupported condition in that area.

When such a localized load is imposed upon the bands in the passageway area the collars 32 are pulled into contact with guide members 34 and the load is thereby transmitted to the bulkhead 10 to which the members are secured. Under heavy impact loads on the entire network area the guide members preferably will fail, thereby permitting uniform loading on the bands crossing the passageway as well as on the remaining bands in the network.

Figure 3 illustrates another network installation in which the bulkhead is not mounted in a single plane perpendicular to the center line of the fuselage. In such a case the network is not pre-loaded and need not be secured to the fuselage at points in close proximity to the periphery of the bulkhead. The reason for this lies in the fact that the bend 36 in the bulkhead will actually release any pre-load on the network if it is forced to the left by cargo impact. In the preferred form it is desirable that some pre-load be applied to the net since this makes certain that the net will have no slack in it at the time the bulkhead fails. However, even in the preferred form the net can be slack and simply clipped or pinned by staples or clips 38 to the bulkhead so long as each band is short enough that the network will be under fairly substantial loads at the time the bulkhead no longer resists cargo movement. Thus the network is considered to be in close proximity to the bulkhead whenever it is installed in a manner that will permit it to function so as to meet the aforementioned requirement. In the preferred form it is also desirable that the length of each band be such that the retention means 40 will be located at the base of the catenary formed by the extension of the network under load. This achieves uniform load distribution and makes the most efficient use of the network.

From the above it is apparent that the primary purpose of the present invention is to provide a network which functions jointly with the impact bulkhead and is specifically designed to cooperate with the particular bulkhead configuration involved. Thus, by careful choice of band lengths and composition the designer can be certain that cargo subject to rapid deceleration will not be permitted to continue its forward movement after failure of the bulkhead, since the network will immediately offer substantial resistance to such further forward movement. The network may be installed either forward of or to the rear of the bulkhead depending upon convenience in view of the particular bulkhead installation involved. Likewise the network may be some distance forward or to the rear of the plane or planes formed by the bulkhead surface. The only requirement in this connection is, as was previously pointed out, that radial band lengths be such that the network will be under load prior to or contemporaneously with failure of the bulkhead. If it is desired that the network be preloaded this can conveniently be achieved by use of bungees or other elastic means which are integral with or secured to the radial bands at convenient locations or by simply installing the bands under tensile loading. The rings 20 and 22 which serve as retention means in the form shown in Figure 2 may be replaced by many well known equivalents such as a small sheet of nylon or fibrous material to which the bands may be sewn, riveted or otherwise secured. The retention means may also be clipped to the bulkhead if the network design permits this expedient as a means for positioning the center of the catenary formed by the network under load.

Although the now preferred embodiments of the present invention have been illustrated and described it is to be understood that the invention need not be limited thereto for it is susceptible to changes in form, detail and application within the scope of the appended claims.

I claim:

1. Cargo retention means for preventing cargo movement in the fuselage of an airplane in normal operation and for resisting the crash impact of said cargo resulting from rapid deceleration of said aircraft, comprising the combination of: a substantially rigid bulkhead structure disposed laterally of said fuselage to withstand normal service loads imposed by cargo movement; a flexible web disposed in substantial parallelism with the surface of said bulkhead structure and in close proximity thereto in order that it will become subject to tension loading when said bulkhead is initially deformed by impact loads, said web including elongate yieldable bands extending radially outward from points opposite the approximate center of said bulkhead structure; means for retention of the inner ends of said radially disposed bands; a plurality of attachment means securely joining the outer ends of said radially disposed bands to the fuselage, and a plurality of yieldable bands approximately concentrically arranged and secured to said radially disposed bands at their points of intersection; said web being subjected to additional tension loads when the crash impact of said cargo causes said bulkhead structure to fail whereby said web is forced to yieldably extend to thereby absorb the remaining forward inertia of said cargo; said web serving at all times to effectively resist the tendency of the cargo to increase its forward inertia during and after failure of said bulkhead structure.

2. Cargo retention means for preventing cargo movement in the fuselage of an airplane in normal operation and for resisting the crash impact of said cargo resulting from rapid deceleration of said aircraft, comprising the combination of: a substantially rigid bulkhead structure disposed laterally of said fuselage to withstand normal service loads imposed by cargo movement; a flexible web disposed in substantial parallelism with the surface of said bulkhead structure and in close proximity thereto in order that it will become subject to tension loading when said bulkhead is initially deformed by impact loads, said web including elongate yieldable bands extending radially outward from points opposite the approximate center of said bulkhead structure; means for retention of the inner ends of said radially disposed bands; a plurality of attachment means securely joining the outer ends of said radially disposed bands to the fuselage; said web being subjected to additional tension loads when the crash impact of said cargo causes said bulkhead structure to fail whereby said web is forced to yieldably extend to thereby absorb the remaining forward inertia of said cargo; said web serving at all times to effectively resist the tendency of the cargo to increase its forward inertia during and after failure of said bulkhead structure.

3. Cargo retention means for preventing cargo movement in the fuselage of an airplane in normal operation and for resisting the crash impact of said cargo resulting from rapid deceleration of said aircraft, comprising the combination of: a substantially rigid bulkhead structure disposed laterally of said fuselage to withstand normal service loads imposed by cargo movement; a flexible web of elongate yieldable bands disposed in substantial parallelism with the surface of said bulkhead structure and in close proximity thereto in order that it will become subject to tension loading when said bulkhead is deformed by impact loads; a plurality of attachment means securely joining the periphery of said network to the fuselage of said airplane; and a second web of elongate yieldable bands similarly secured by a plurality of attachment means at a position rearward of said bulkhead structure and said first web to reduce the initial impact of said cargo against said bulkhead structure and said first web; said first web being subjected to additional tension loads when the crash impact of said cargo causes said bulkhead structure to fail and thereby force said web to yieldably extend further to thereby absorb the remaining forward inertia of said cargo, said first web at all times effectively resisting the tendency of the cargo to increase its forward inertia during and after failure of said bulkhead structure.

4. Cargo retention means for preventing cargo movement in the fuselage of an airplane in normal operation and for resisting the crash impact of said cargo resulting from rapid deceleration of said aircraft, comprising the combination of: a substantially rigid bulkhead structure disposed laterally of said fuselage to withstand normal service loads imposed by cargo movement; a flexible network of elongate yieldable bands disposed, when in its unloaded position, as a surface in close proximity to said bulkhead structure; and a plurality of attachment means securely joining the periphery of said network to the fuselage of said airplane; said structure serving to absorb the initial crash impact of the cargo and said yielding network serving to absorb the remaining forward inertia of said cargo.

5. Cargo retention means for preventing cargo movement in the fuselage of an airplane in normal operation and for resisting the crash impact of said cargo resulting from rapid deceleration of said aircraft, comprising the combination of: a substantially rigid bulkhead structure disposed laterally of said fuselage to withstand normal service loads imposed by cargo movement; a flexible light-weight web of elongate yieldable bands disposed in substantial parallelism with the surface of said bulkhead structure and in close proximity thereto in order that it will become subject to tension loading when said bulkhead is initially deformed by impact loads; and a plurality of attachment means securely joining the periphery of said web to the fuselage of said airplane; said web being subjected to additional tension loads when the crash impact of said cargo causes said bulkhead structure to fail; thereby forcing said web to yieldably extend still farther to finally absorb the remaining forward inertia of said cargo.

6. Cargo retention means for preventing cargo movement in the fuselage of an airplane in normal operation and for resisting the crash impact of said cargo resulting from rapid deceleration of said aircraft, comprising the combination of: a substantially rigid bulkhead structure disposed laterally of said fuselage to withstand normal service loads imposed by cargo movement; a flexible network of elongate yieldable bands disposed, when in its unloaded position, as a surface in close proximity to said bulkhead structure, said network being positioned so as to be subject to tension loads at such time as said bulkhead structure is substantially deformed; and a plurality of attachment means securely joining the periphery of said network to the fuselage of said airplane; said structure serving to absorb the initial crash impact of the cargo and said yielding network serving to absorb the remaining forward inertia of said cargo.

7. Cargo retention means for preventing cargo movement in the fuselage of an airplane in normal operation and for resisting the crash impact of said cargo resulting from rapid deceleration of said aircraft, comprising the combination of: a substantially rigid bulkhead structure disposed laterally of said fuselage to withstand normal service loads imposed by cargo movement; a flexible network of elongate yieldable bands disposed, when in its unloaded position, as a surface in close proximity to said bulkhead structure; said network including a plurality of attachment means securely joining end portions of said bands to the fuselage of said airplane; and means for retention of the opposite end portions of said bands at points located near the approximate center of said bulkhead structure; said network being subjected to tension loads when said bulkhead structure is substantially deformed; said structure serving to absorb the major portion of the initial crash impact of the cargo and said yielding network serving to absorb the remaining forward inertia of said cargo to thereby safeguard persons and objects forward of said cargo retention means.

8. Cargo retention means for preventing cargo movement in the fuselage of an airplane in normal operation and for resisting the crash impact of said cargo resulting from rapid deceleration of said aircraft, comprising the combination of: a substantially rigid bulkhead structure disposed laterally of said fuselage to withstand normal service loads imposed by cargo movement; a flexible web disposed in substantial parallelism with the surface of said bulkhead structure and in close proximity thereto, said web including elongate yieldable bands extending radially outward from points opposite the approximate center of said bulkhead structure, means for retention of the inner ends of said radially disposed bands, a plurality of attachment means securely joining the outer ends of said radially disposed bands to the fuselage, and a plurality of yieldable bands approximately concentrically arranged and secured to said radially disposed bands at their points of intersection; said web being subjected to tension loads when the crash impact of said cargo causes said bulkhead structure to fail whereby said web is forced to yieldably extend to thereby absorb the remaining forward inertia of said cargo; said web serving at all times to effectively resist the tendency of the cargo to increase its forward inertia during and after failure of said bulkhead structure.

9. Cargo retention means for preventing cargo movement in the fuselage of an airplane in normal operation and for resisting the crash impact of said cargo resulting from rapid deceleration of said aircraft, comprising the combination of: a substantially rigid bulkhead structure disposed laterally of said fuselage to withstand normal service loads imposed by cargo movement; a flexible web disposed in substantial parallelism with the surface of said bulkhead structure and in close proximity thereto, said web including elongate yieldable bands extending radially outward from points opposite the approximate center of said bulkhead structure, means for retention of the inner ends of said radially disposed bands, a plurality of attachment means securely joining the outer ends of said radially disposed bands to the fuselage; said web being subjected to tension loads when the crash impact of said cargo causes said bulkhead structure to fail whereby said web is forced to yieldably extend to thereby absorb the remaining forward inertia of said cargo; said web serving at all times to effectively resist the tendency of the cargo to increase its forward inertia during and after failure of said bulkhead structure.

BRUCE E. DEL MAR.

References Cited in the file of this patent

UNITED STATES PATENTS

| Number | Name | Date |
| --- | --- | --- |
| 980,789 | Jeffery | Jan. 3, 1911 |
| 2,160,870 | Jones | June 6, 1939 |